United States Patent [19]

Kalfoglou

[11] Patent Number: 4,627,494

[45] Date of Patent: Dec. 9, 1986

[54] METHOD OF USING A LIGNOSULFONATE/CARBOHYDRATE SYSTEM AS A SACRIFICIAL AGENT FOR SURFACTANT FLOODING

[75] Inventor: George Kalfoglou, Houston, Tex.

[73] Assignee: Texaco Inc., White Plains, N.Y.

[21] Appl. No.: 707,990

[22] Filed: Mar. 4, 1985

[51] Int. Cl.$^4$ ............................................. E21B 43/22
[52] U.S. Cl. .................................. 166/274; 166/275; 252/8.554
[58] Field of Search .............................. 166/273–275; 252/8.55 D

[56] References Cited

U.S. PATENT DOCUMENTS

| | | | |
|---|---|---|---|
| 2,961,400 | 11/1960 | Park | 166/275 |
| 3,292,696 | 12/1966 | Sandiford | 166/273 |
| 3,421,582 | 1/1969 | Fallgatter | 166/273 |
| 3,482,631 | 10/1969 | Jones | 166/273 |
| 3,565,175 | 2/1971 | Wilson | 166/273 X |
| 3,848,673 | 11/1974 | Clampitt et al. | 166/275 |
| 3,977,470 | 8/1976 | Chang | 166/274 X |
| 4,133,385 | 1/1979 | Kalfoglou | 166/273 |
| 4,142,582 | 3/1979 | Kalfoglou | 166/273 |
| 4,157,115 | 6/1979 | Kalfoglou | 166/274 |
| 4,172,497 | 10/1979 | Kalfoglou | 166/273 |
| 4,172,498 | 10/1979 | Kalfoglou | 166/273 |
| 4,196,777 | 4/1980 | Kalfoglou | 166/273 |
| 4,249,606 | 2/1981 | Kalfoglou | 252/8.55 D X |
| 4,249,608 | 2/1981 | Carter | 252/8.5 D X |
| 4,271,906 | 6/1981 | Bousaid et al. | 166/273 |
| 4,479,542 | 10/1984 | Wakchol et al. | 166/273 |

*Primary Examiner*—George A. Suchfield
*Attorney, Agent, or Firm*—Jack H. Park; Kenneth R. Priem; Harold J. Delhommer

[57] ABSTRACT

The disclosed sacrificial agent invention is a method of injecting a solution containing about 0.1% to about 10% by weight of a mixture of at least two sacrificial agents, wherein one sacrificial agent is a lignosulfonate and the second sacrificial agent is a carbohydrate, more specifically, a starch or cellulose derivative. The starch or cellulose derivative suitable for the second sacrificial agent can be found in the group comprising alkoxylated starch, esterified starch, oxidized starch, phosphated starch, alkoxylated cellulose, carboxyalkyl cellulose, carboxyalkylalkoxylated cellulose, alkylalkoxylated cellulose, cellulose sulfates and cellulose acetate sulfates.

16 Claims, 4 Drawing Figures

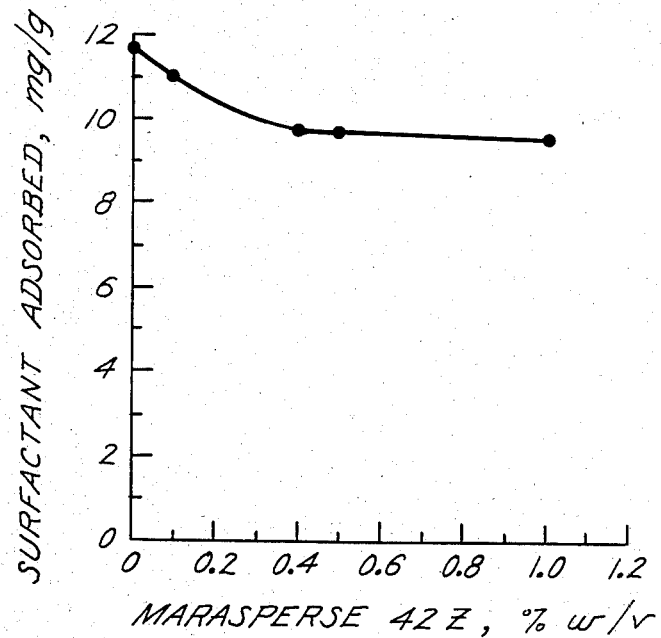
Fig. 1  SURFACTANT ADSORBED ON CRUSHED CORE MATERIAL PRETREATED WITH MARASPERSE 42Z
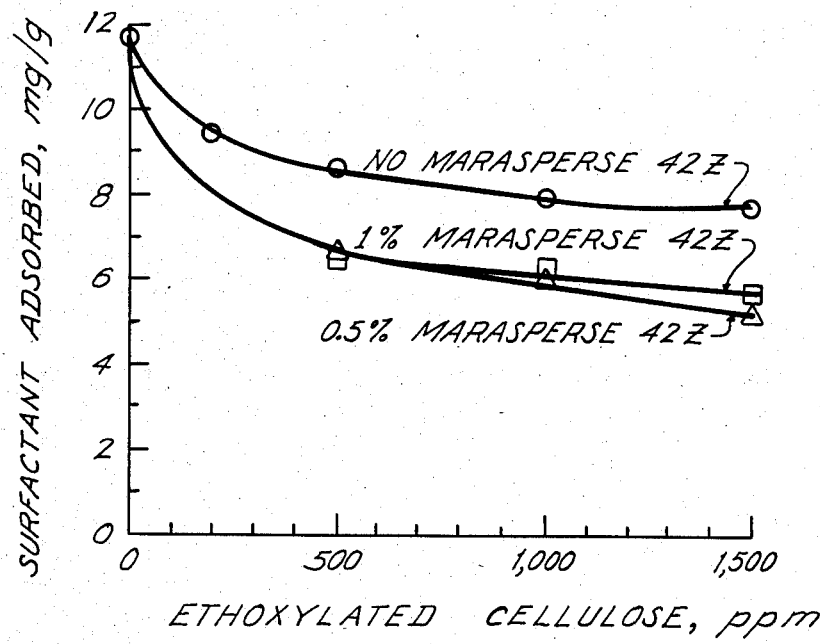
Fig. 2  SURFACTANT ADSORPTION ON CRUSHED CORE MATERIAL PRETREATED WITH MARASPERSE 42Z / ETHOXYLATED CELLULOSE SOLUTIONS

METHOD OF USING A LIGNOSULFONATE/CARBOHYDRATE SYSTEM AS A SACRIFICIAL AGENT FOR SURFACTANT FLOODING

BACKGROUND OF THE INVENTION

This invention relates to a method of injecting chemicals into a hydrocarbon reservoir for the purpose of increasing hydrocarbon recovery. More particularly, the invention pertains to the use of a sacrificial agent system of lignosulfonate and starch, or lignosulfonate and cellulose to decrease adsorption of surfactants within hydrocarbon reservoirs.

One of the most vexing problems in the use of surfactant flooding for enhanced oil recovery is the frequent, substantial loss of surfactant due to adsorption on the formation matrix and precipitation by polyvalent cations such as calcium and magnesium. A significant percentage of surfactants are also physically entrapped within the pore spaces of the rock matrix. Of chief concern is surfactant adsorption on the formation matrix which significantly decreases surfactant flood efficiency, making it necessary to inject a greater quantity of surfactant and increasing the cost of any surfactant flood.

Additionally, most surfactants are satisfactory for surfactant flooding only if the calcium and magnesium concentrations of the formation water fall below about 500 ppm. Petroleum sulfonates, the most popular type of surfactants, precipitate where divalent ion concentrations exceed about 500 ppm. Such precipitation renders the sulfonates inoperative for recovering oil and in some instances, causes formation plugging.

The most promising approach for reducing the amount of surfactants retained by the formation matrix has been to use sacrificial agent compounds, either in a preflush solution injected before the surfactant-containing solution, or in the surfactant solution. The compounds are sacrificial in that their adsorption on the formation matrix and entrapment within the pore spaces of the formation reduces the loss of the more expensive surfactants, solubilizers and polymers contained within the surfactant solutions.

Various chemicals have been employed as sacrificial agents to decrease the adsorption of surfactants or to tie up polyvalent cations and prevent them from precipitating surfactants from the flooding medium. Lignosulfonates form one class of compounds which have been found to have excellent properties as sacrificial agents. They are economically attractive because they are by-products of the pulp industry. Supply is plentiful and product costs are much less than the costs of surfactants employed in enhanced oil recovery floods. The use of various lignosulfonates has been disclosed extensively in the literature.

U.S. Pat. Nos. 4,157,115 and 4,271,906 disclose several methods of using aqueous solutions of lignosulfonate salts as sacrificial agents. The use of oxidized lignosulfonates is disclosed in U.S. Pat. Nos. 4,133,385 and 4,196,777. Chrome lignosulfonates as sacrificial agents are described in U.S. Pat. No. 4,142,582. U.S. Pat. No. 4,172,497 discloses the use of lignosulfonates carboxylated with chloroacetic acid and U.S. Pat. No. 4,172,498 discloses sulfomethylated lignosulfonates as sacrificial agents. U.S. Pat. No. 4,479,542 describes a sacrificial afterflush method employing lignosulfonates.

SUMMARY OF THE INVENTION

The disclosed invention is a method of injecting a solution containing about 0.1% to about 10% by weight of a mixture of at least two sacrificial agents, said mixture comprised of one sacrificial agent which is a lignosulfonate and a second sacrificial agent which is a carbohydrate, more specifically, a starch or cellulose derivative. The starch or cellulose derivatives suitable for the second sacrificial agent can be found in the group of alkoxylated starch, esterified starch, oxidized starch, phosphated starch, alkoxylated cellulose, carboxyalkyl cellulose, carboxyalkylalkoxylated cellulose, alkylalkoxylated cellulose, cellulose sulfates, and cellulose acetate sulfates. All of the above starch and cellulose derivatives give similar behavior when employed as sacrificial agents.

The solution of sacrificial agents is injected into the formation to decrease the loss of more costly surfactant, solubilizer and polymer to the formation. The invention sacrificial agent system is preferably injected into the hydrocarbon formation in conjunction with the surfactant solution, but may also be injected prior to or after the injection of the surfactant system.

BRIEF DESCRIPTION OF THE DRAWINGS

FIG. 1 is a graph which illustrates the adsorption of surfactant on crushed core material which has been pretreated with a carboxylated lignosulfonate as it varies with different concentrations of the lignosulfonate.

FIG. 2 is a graphic illustration of surfactant adsorption on crushed core material which has been pretreated with different solutions of a carboxylated lignosulfonate and an ethoxylated cellulose.

DETAILED DESCRIPTION

Figure 3:
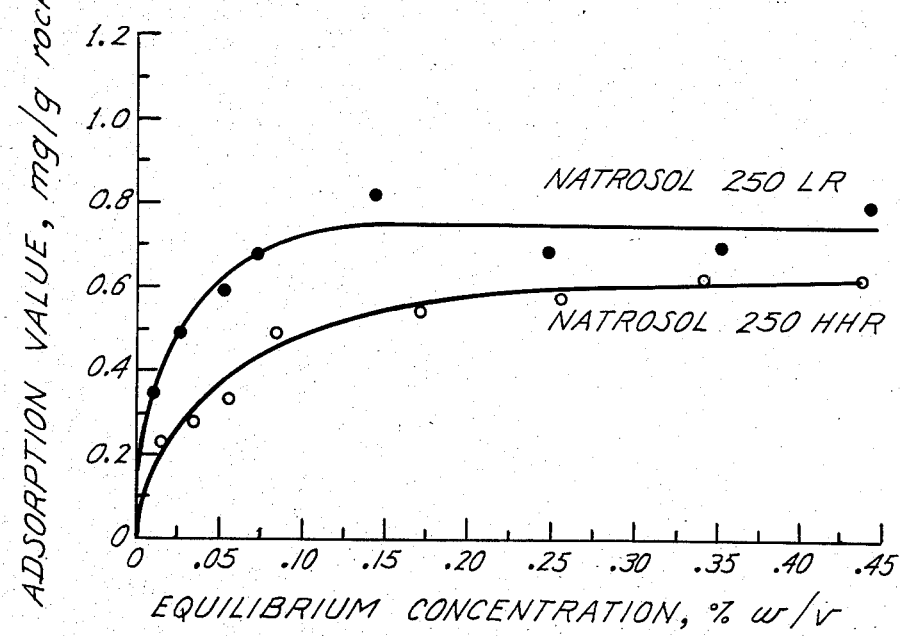
FIG. 3 is a graph illustrating adsorption isotherms of hydroxyethyl cellulose on crushed core material.

In carrying out the invention, a solution containing an anionic sacrificial agent, a lignosulfonate, and a second sacrificial agent, a starch or a cellulose derivative, is injected as a sacrificial material through an injection means comprising one or more injection wells into a hydrocarbon formation. The sacrificial material is injected in a manner to occupy or cover substantially all potential adsorption or retention sites of the rock within the hydrocarbon formation, thereby reducing the extent of injected surfactant, solubilizer and polymer adsorption. The phrase "adsorption sites" of the matrix or formation rock is used to mean those portions of the formation rock surface, including matrix pores, which are capable of adsorbing or entrapping a chemical compound from a solution on contact.

The highly undesirable loss of surfactant in chemical flooding may generally be attributed to two main phenomena. The first phenomenon is chemical removal or inactivation of the surfactant after contact with polyvalent cations or other materials dissolved in the formation fluids. Frequently, the end result is precipitates which leave less surfactant in solution and which lower formation permeability. The second phenomenon is adsorption within the formation due to physical contact of the surfactant with the formation matrix or entrapment within pores of the matrix. It is believed that both phenomena exist simultaneously to varying degrees in most chemical flooding operations.

It is believed that sacrificial agents generally work by one or more of several chemical mechanisms. However, it must be emphasized that these chemical mechanisms are theoretical and the extent to which any one of these mechanisms may be responsible for the effectiveness of a sacrificial agent is unknown. One possible sacrificial mechanism is the complexing of the sacrificial agent with polyvalent cations in solution, both by neutral and by charged sacrificial complexing agents. To the extent that the sacrificial agent complexes with polyvalent cations in the formation fluids, there will be less polyvalent cations left for the surfactant to interact with.

A second possible mechanism is the electrostatic attraction of the matrix and the sacrificial agent for each other. This is predominantly controlled by the surface charge at the multitudes of matrix adsorption sites. The electrostatic attraction mechanism is highly dependent upon the composition of the formation matrix. For instance, sandstones which may contain many different types of clays, will have different types of attractions for sacrificial agents and surfactants.

A third possible sacrificial mechanism arises from the fact that polymers have many functional groups and may attach themselves to the rock surface at plural sites, thereby blocking access to other sites on which injected surfactants, solubilizers and polymers could adsorb. In this manner, the large size of polymer molecules may block entrances to very small pores where much of the surface area and many adsorption sites lie.

Furthermore, the character of the formation matrix, be it carbonate, bentonite, kaolinite or something between these three disparate types of substrates, also has a significant impact upon the effectiveness of the sacrificial material. Sacrificial agents which are highly effective in limestone reservoirs may be ineffective when employed in sandstone formations. Finally, the surfactant itself that is employed also alters adsorption, but it is generally not as critical as the type of formation matrix.

Various lignosulfonate derivatives have been employed as sacrificial agents in limestone floods. But due to the nature of their chemical structure, anionic lignosulfonates do not function as effectively as sacrificial agents in sandstone reservoirs because the primary minerals on which surfactants adsorb have a low point of zero charge. The adsorption sites in a sandstone matrix are not all of the same type. Although a large number of adsorptive sites in sandstone are negatively charged, there are also some positively charged adsorption sites. Thus, the sacrificial agent system employed should adsorb on both the negatively and positively charged adsorption sites in the matrix. Thus, the effectiveness of a sacrificial agent system can be increased by using a combination sacrificial agent system composed of more than one substance so that adsorption can take place both at negatively and positively charged sites. Such a flexible sacrificial agent system can be tailored to perform well for reducing adsorption on many different types of substrates.

The invention sacrificial agent system employs at least two sacrificial agents in a combination system, an anionic lignosulfonate and preferably, a nonionic starch or cellulose derivative. Several different lignosulfonate derivatives such as oxidized lignosulfonates, chrome lignosulfonates, carboxylated lignosulfonates and sulfomethylated lignosulfonates may be employed in the sacrificial system, but carboxylated lignosulfonates are preferred. Lignosulfonates are anionic polyelectrolytes soluble in water and tolerant of hard water. They are thermally stable in formations where the temperature is high. Lignosulfonates are macromolecules built up by complex condensation of phenyl propane units. The sulfonate groups are attached to the aliphatic side chain. They are water soluble with molecular weights ranging from several thousand to about 50,000 or more.

The derivatives of sulfonated alkali lignins and sulfite lignosulfonates may be employed. Lignosulfonates having degrees of sulfonation from about 2.0 to saturation are acceptable as starting materials for the modified lignosulfonates employed in the combination sacrificial system. Cations which are acceptable include $Na+$, $K+$, $NH_4+$, $Ca++$ and $Mg++$. The degree of sulfonation is the weight percentage of sulfonate ($SO_3{}^-$) compared to the total molecular weight.

Crude unmodified lignosulfonates may be made with either softwoods or hardwoods. Although they have basically the same functional groups, the crude unmodified softwood lignosulfonates have more sulfonate and hydroxyl groups than the crude unmodified hardwood lignosulfonates. Thus, crude unmodified softwood lignosulfonates generally have better hard water tolerance than the hardwood lignosulfonates.

The sacrificial system is injected into the formation containing about 0.1% to about 6% by weight of a lignosulfonate, preferably, about 0.2% to about 4.0% by weight of a carboxylated lignosulfonate. Carboxylation of lignosulfonates is accomplished by reaction with reactants rich in carboxylated groups, such as chloroacetic acid.

This sacrificial system must also contain about 0.02% to about 4.0% by weight of a cellulose derivative, preferably about 0.03% to about 1.0% by weight of a hydroxyethyl cellulose having a degree of substitution of about 0.5% to about 2.0%. About 0.1% to about 4.0% by weight of an alkoxylated starch, preferably about 0.2% to about 2.0% by weight of an ethoxylated or propoxylated starch, may be substituted for the cellulose derivative. The alkoxylated starch preferably has a degree of substitution of about 0.05% to about 0.5%. The starch compounds have average molecular weights between about 20,000 and about 500,000. The cellulose compounds have average molecular weights ranging between about 40,000 and about 1,000,000.

The most preferred cellulose and starch derivatives are alkoxylated cellulose and alkoxylated starch. Ethoxylated cellulose may be prepared by reacting a purified cellulose with sodium hydroxide to produce swollen alkali cellulose and then reacting with ethylene oxide to obtain the adduct. In this reaction, the hydrogen atoms in the hydroxyl groups of cellulose are replaced by ethylene oxide groups. The degree of substitution on each anhydroglucose unit of the cellulose molecule may reach the maximum value of 3 since there are three hydroxyl groups per unit. Once an ethylene oxide group is attached, it can further react with additional groups to form a polyoxyethylene side chain. This reaction can continue as long as ethylene oxide is available. Water solubility of cellulose is achieved when the degree of substitution is about 1.0 or higher. The molar substitution (average number of ethylene oxide molecules per anhydroglucose unit) should be about two or higher for effective performance.

The D-glucose units in starch contain one primary and two secondary alcohol groups. During alkoxylation, a small number of hydroxyl groups are substituted. The degree of substitution is the average number of substituents per glucose unit. Maximum possible degree of substitution as in the cellulose reaction is 3.0. Alkoxylated starch can be prepared by the reaction of air-dried starch with ethylene oxide. The degree of substitution can be adjusted by utilizing the necessary amount of ethylene oxide in the reaction. Polyoxyalkylated groups may form at higher degrees of substitution.

Additional cellulose and starch derivatives besides alkoxylated cellulose and alkoxylated starch may also be employed with the anionic lignosulfonate in the combination sacrificial system. Other workable cellulose derivatives are carboxyalkyl cellulose, carboxyalkylalkoxylated cellulose, alkylalkoxylated cellulose, cellulose sulfates and cellulose acetate sulfates. Other starch derivatives which may also be employed are: esterified starch, oxidized starch and phosphated starch. All of these starch and cellulose derivatives exhibit similar sacrificial agent properties when employed as sacrificial agents in such formulations. The above starch and cellulose derivatives are all commercially available.

Preferably, the sacrificial agent system is coinjected into the subterranean formation in solution with the surfactant and solubilizer slug. The invention sacrificial agent system may also be injected prior to the injection of the surfactant system or after the injection of the surfactant system, but an injection in solution with the surfactant and polymer system or systems is preferred.

When a lignosulfonate is coinjected with a surfactant slug, the lignosulfonate molecules have a tendency to move ahead of the surfactant. It is believed that this tendency is due to the much larger size of the lignosulfonate molecules compared to the surfactant molecules. The larger lignosulfonates will pass up many of the smaller rock pores and the smaller surfactant molecules will interact more with the rock matrix. Thus, it may be desirable to inject some sacrificial agent immediately behind the surfactant as well as with the surfactant slug to insure that all of the surfactant slug is adequately protected by the sacrificial agent system.

When sacrificial agents are used in a preflush solution and injected prior to the surfactant system, the length of time before oil recovery is increased since the sacrificial agents will not recover any oil. Any extra time imposed by the flooding process before additional oil recovery may significantly reduce the overall economics of the process. In addition, preflushes in general are often not as effective as expected because of conformity problems and large reservoir volumes. There is no assurance that the flow path of the surfactant solution will sufficiently coincide with that of the preflush sacrificial agent solution.

The performance of postflushes of sacrificial agents may also suffer where a sacrificial agent solution is injected into the reservoir after the injection of the surfactant or polymer system. With a postflush injected after the surfactant system, less surfactant will generally be recovered from the formation because the surfactant system will have already occupied many of the adsorption sites in the matrix and the sacrificial agent will be unable to desorb surfactant and occupy as many adsorption sites as in a preflush or concurrent injection scheme.

Both the sacrificial agent system and the surfactant formulation may be injected into the subterranean hydrocarbon formation in an aqueous solution or a non-aqueous solution with a hydrocarbon solvent, depending upon other requirements. When the sacrificial agent system is injected in a mixture with the surfactant or micellar formulation, it is necessary that the admixture be phase stable. Chromatographic separation complications can be minimized by introducing the sacrificial agent system in both the surfactant slug and in the trailing mobility control polymer slug.

The quantity of sacrificial agent system to be injected should be sufficient to occupy or cover substantially all of the active adsorption sites of the formation matrix in order to achieve a maximum reduction in the amount of surfactant loss to the formation. If less than this optimum amount is used, the corresponding reduction and surfactant loss to the formation will not be as great as in the case where the formation adsorption sites were completely saturated. A balance must be struck with the economics of the surfactant flood. Of course, the use of excess sacrificial agent materials will substantially increase the cost of the chemical flood.

The preferred total amount of sacrificial lignosulfonate and carbohydrate system injected will vary with the composition of the formation, the thickness of the formation, the pattern area to be swept and various other formation characteristics. Process design data coupled with field experience can determine the approximate quantity of sacrificial agent system needed for best results. But it should be noted that surfactant losses in the field have been found to be invariably higher than the projected losses from laboratory work. This is particularly so when the formation matrix contains large quantities of clays.

Thus, considerable knowledge of the formation matrix and formation fluids is necessary in order to determine the optimum amount of sacrificial agent system of lignosulfonate and carbohydrate to be injected to achieve the maximum economical reduction in surfactant loss. If the hydrocarbon formation is relatively clean sandstone lacking substantial clay content, significantly smaller quantities of sacrificial agent will be needed than in the case where the formation contains large amounts of highly adsorbent clays.

The effectiveness of using a combination sacrificial agent system of a lignosulfonate and a starch or cellulose for reducing surfactant, solubilizer and polymer loss in chemical flooding operations is demonstrated by the following examples. These examples are presented for illustrative purposes only and should not be construed to limit the scope of the invention, which is defined in the claims that follow.

EXAMPLES

Adsorption bottle tests and core floods can be performed in the laboratory which will give a rough indication of the performance of sacrificial agent systems in the field. A considerable number of adsorption bottle tests and core floods were conducted on various components of the invention sacrificial agent system. Crushed sandstone core material from a Southern Illinois hydrocarbon reservoir was employed in the bottle tests In every case, the core material was crushed to a size between 80 and 200 mesh. X-ray mineralogical analysis of several samples of the particular core material used yielded compositions of about 3% illite, 3% kaolinite, 0% montmorillonite, and a total clay content of about 6% with about 20% of the clays being expandable clays. The analysis further indicated that about 90% of the sandstone was quartzite by weight, about 0% K-feldspar, about 0% to about 3% plagioclase feldspar, about 0% calcium and about 0% dolomite. All of the above percentage figures are percent by weight.

The petroleum sulfonate and solubilizer solution employed in the tests to derive FIGS. 1 and 2 only was a 2.5% by weight solution containing about 1.2% of a petroleum sulfonate sold under the trademark Petrostep 399 by Stepan Chemical Co., about 0.6% of a petroleum sulfonate sold under the trademark Petrostep 465 and about 0.7% of a sulfate surfactant sold under the trademark Alipal CO436 by GAF Corp. The numbers in the Petrosteps trademarks are an approximation of the equivalent weights of each petroleum sulfonate. The Alipal CO436 compound is an ammonium salt of a sulfated alkyl phenoxypoly(oxyethylene)ethanol.

For all other examples, the petroleum sulfonate and solubilizer solution employed was a 2.5% by weight solution containing about 0.9% of a petroleum sulfonate sold under the trademark of Witco TRS-18 by Witco Chemical Co., about 0.9% of a petroleum sulfonate sold under the trademark Witco TRS-40 by Witco Chemical Co. and about 0.7% of an ethoxylated anionic surfactant sold under the trademark LN-60COS by Texaco Chemical Co. The brine used for all solutions in these examples was a 52,500 ppm total dissolved solids (TDS) brine containing about 2500 ppm divalent ions.

The adsorption bottle tests reported in FIGS. 1 and 2 were conducted by contacting the crushed core material with the sacrificial agent solutions of varying concentrations for 24 hours. The pretreated solids were then separated from the sacrificial agent solutions and contacted with the 2.5% petroleum sulfonate-solubilizer solutions. The amount of surfactant adsorbed was determined from the difference between the uncontacted and contacted surfactant concentrations. The control adsorption value was obtained by pretreating the crushed core material with brine only and then contacting the crushed core material with the same surfactant solution.

Without a sacrificial agent, 11.8 mg of surfactant was adsorbed per gram of crushed core material. The use of 0.4% to 1.0% by weight of Marasperse 42Z reduced the surfactant adsorption to values of 9.8 mg per gram and 9.6 mg per gram, respectively. The maximum reduction in surfactant adsorption from the use of the Marasperse 42Z was 18.6%. Use of Marasperse 42Z in a preflush ahead of the surfactant slug in a core flood only increased the recovered surfactant by about 10%. Marasperse 42Z is a trademarked carboxylated lignosulfonate (carboxylated by ozonation) formerly sold by American Can Co. with an approximate molecular weight of about 20,000 to about 50,000. The product is now sold under the trademark Petrolig ERA-7 by Reed Ltd. Chemical Division. The chemical structure and properties of Marasperse 42Z are described in U.S. Pat. No. 4,196,777, incorporated herein by reference.

A combination sacrificial agent system according to the present invention was much more effective in reducing surfactant adsorption. FIG. 2 illustrates the surfactant adsorption on the crushed core material with the use of ethoxylated cellulose and no lignosulfonate, as well as two combination sacrificial systems employing the Marasperse 42Z with an ethoxylated cellulose.

The adsorption bottle tests of FIG. 2 were conducted using the same procedure as the tests for FIG. 1. About 1500 ppm (0.15%) of an ethoxylated cellulose sold under the trademark Cellosize WP-09 by Union Carbide Corp. with a degree of substitution of about 1 and a molar substitution of about 2 was employed with the Marasperse 42Z. The ethoxylated cellulose alone performed better in decreasing surfactant adsorption than the Marasperse 42Z alone. Surfactant adsorption was reduced to values of about 8.7 mg per gram to about 7.8 mg per gram for concentrations of 0.05% to 0.15% of ethoxylated cellulose. As indicated in FIG. 2, the combination systems of Marasperse 42Z and Cellosize WP-09 produced much better results than either the Marasperse 42Z or the Cellosize WP-09 acting alone. Substantial unexpected reductions in surfactant adsorption were achieved with both the 1% and 0.5% Marasperse 52Z systems with ethoxylated cellulose. For instance, the reduction in surfactant adsorption for the 0.5% lignosulfonate/ethoxylated cellulose system was 54.2%.

The synergism that results from the combination of the lignosulfonate and ethoxylated cellulose is certainly more than an additive effect. This is indicated by the better results achieved with the combination sacrificial system employing 0.5% Marasperse 42Z over the combination system with 1% Marasperse 42Z. If the results were merely additive, one would expect better results to be achieved with the 1% Marasperse 42Z combination system, since in FIG. 1 less surfactant was adsorbed on the crushed core material treated with only 1% Marasperse 42Z as compared to the surfactant adsorbed on the core material treated only with 0.5% Marasperse 42Z.

The effectiveness of a hydroxyethyl cellulose as a sacrificial adsorbing agent on sandstone rock surfaces was demonstrated by obtaining the adsorption isotherms of two hydroxyethyl cellulose compounds, Natrosol 250 LR and Natrosol 250 HHR, which are plotted in FIG. 3. These are trademarked hydroxyethyl cellulose compounds sold by Hercules Inc. The 250 LR compound has a molecular weight of about 40,000 and the 250 HHR has a molecular weight of about 900,000. FIG. 3 aptly illustrates that the lower molecular weight hydroxethyl cellulose (Natrosol 250 LR) adsorbed on the crushed core material to a much greater extent than the higher molecular weight compound (Natrosol 250 HHR). Thus, the lower molecular weight compound which seemed to be a much better sacrificial agent than the higher molecular weight hydroxyethyl cellulose. The steeper slope of the adsorption isotherm for the 250 LR compound offers further proof that the 250 LR compound would be a better sacrificial agent.

Figure 4:
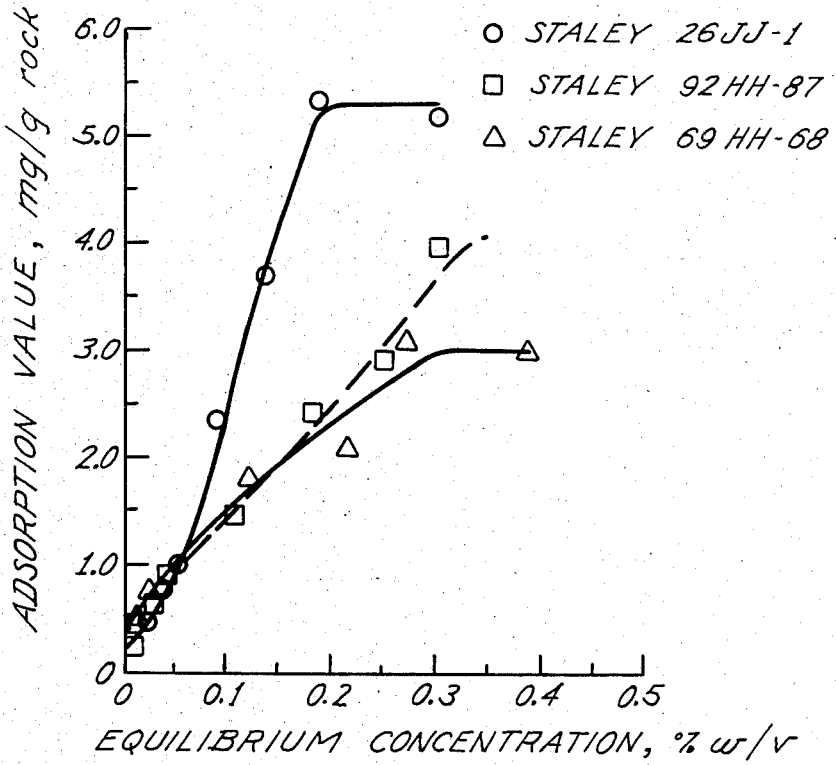
FIG. 4 is a graph illustrating adsorption isotherms of three starch derivatives on crushed core material.

The adsorption isotherms of three alkoxylated starches, Staley 26JJ-1, Staley 69H-68 and Staley 92HH-87 are shown in FIG. 4. Staley 26JJ-1 is the trademark for a hydroxypropylated starch with a 0.15 degree of substitution. Staley 69HH-68 is the trademark for a carboxymethylated starch with a 0.3 degree of substitution. Staley 92HH-87 is a hydroxypropylated and carboxymethylated starch with a 0.2 degree of substitution for both the hydroxypropylation and the carboxymethylation. All three Staley starches are sold by A. E. Staley Manufacturing Co.

The adsorption values for all three of these starch derivatives are substantially larger than the adsorption values noted for the hydroxyethyl cellulose compounds tested. Although the isotherm for Staley 92HH-87 did not level off over the concentration range tested, higher starch concentrations were not tested because of phase instability problems.

The adsorption isotherms of the cellulose and starch derivatives illustrated in FIGS. 3 and 4 were obtained by measuring the equilibrium concentrations of the solutions contacted with the crushed core material and identical solutions that had not been contacted. The concentrations were measured by the phenol-sulfuric acid colorimetric method. Standard solutions of 0.0025% to 0.01% in the brine solution were prepared from 2% stock solution.

Each solution was treated according to the following procedure. 1 ml of standard solution was mixed with 1 ml of 5% phenol in a small bottle on a magnetic stirrer. While the solution was stirring, 5 ml of concentrated sulfuric acid were quickly pipetted directly onto the surface of the solution. The solution was allowed to cool for 10 minutes and was stirred again for 1 minute. The solution was then cooled in a water bath at approximately 25° C. for 20 minutes. Care was taken to mix all solutions in the same way to obtain reproducible results. One blank solution containing only brine was treated in the same manner to provide a zero reference. The adsorbence of the final reaction solution was measured at 490 nm on the Beckman Model 35 Spectrophotometer. The procedure was repeated three times for each solution to minimize errors. The adsorbences were plotted against concentrations to obtain a calibration curve.

The adsorption tests were carried out by preparing 100 ml cellulose solutions of concentrations ranging from 0.025% to 0.5% in 52,500 TDS brine. Amounts of 20 g of crushed core material were mixed in 50 ml cellulose solutions, and both the contacted and uncontacted solutions were mixed for 24 hours. After equilibration and centrifugation, the equilibrium solutions were removed from each bottle with a pipette to minimize disturbance in the sediments. Both the contacted and uncontacted solutions were diluted and were reacted following the procedure described above for the standard solutions. The absorbences of both the contacted and uncontacted solutions were measured on the spectrophotometer, and the concentrations were determined from the calibration curve. The adsorption isotherms were obtained by plotting adsorption values against the equilibrium concentrations of the contacted solutions to yield FIGS. 3 and 4.

Bottle adsorption tests were conducted according to the procedure of FIGS. 1 and 2 on the Natrosol hydroxyethyl cellulose products to yield a percentage reduction in surfactant adsorption. These results are reported in Table 1.

TABLE 1

| Ex. | Sacrificial Agent | Molecular Weight | Reduction In Surfactant Adsorption |
|---|---|---|---|
| 1 | 0.1% Natrosol 250 LR | 40,000 | 56% |
| 2 | 0.1% Natrosol 250 MR | 250,000 | 16% |
| 3 | 0.2% Natrosol 250 MR | 250,000 | 25% |
| 4 | Natrosol 250 HHR | 900,000 | — |

The low molecular weight cellulose, Natrosol 250LR, gave a 56% reduction in surfactant adsorption, the best results by a wide margin for the cellulose products tested. The compound Natrosol 250 HHR was not tested as a sacrificial agent in a surfactant solution because of polymer/surfactant phase stability problems. The 250 HHR/surfactant mixture underwent phase separation. Thus, it did not have the required chemical stability for adsorption studies. No phase separation problems were encountered with the other compounds.

It is believed that the lower molecular weight hydroxyethyl cellulose compounds performed better than the higher molecular weight compounds because the lower molecular weight compounds occupy a substantially smaller volume. Thus, the lower molecular weight hydroxyethyl cellulose would have access to smaller pore spaces in the crushed core material and consequently, higher surface areas.

The adsorption of the best of the hydroxyethyl cellulose compounds, Natrosol 250LR, was tested in combination with the Marasperse 42Z. The results, reported in Table 2 below, indicate that either 0.05% or 0.1% Natrosol 250LR in combination with 0.5% Marasperse 42Z have near maximum effectiveness in reducing surfactant adsorption on this sandstone core material.

TABLE 2

| Ex. | Sacrificial Agent | Adsorption Value, mg/g | % Reduction in Adsorption |
|---|---|---|---|
| 5 | None | 2.87 | — |
| 6 | 0.05% Natrosol 250 LR | 1.35 | 53 |
| 7 | 0.15% Natrosol 250 LR | 1.58 | 45 |
| 8 | 0.5% Marasperse 42Z | 2.37 | 17 |
| 9 | 0.5% Marasperse 42Z and 0.05% Natrosol 250 LR | 0.45 | 84 |
| 10 | 0.5% Marasperse 42Z and 1% Natrosol 250 LR | 0.58 | 80 |
| 11 | 0.5% Marasperse 42Z and 0.15% Natrosol 250 LR | 1.15 | 60 |

The increased reduction in surfactant adsorption by the combination of lignosulfonate and hydroxyethyl cellulose solution discovered in the tests of FIG. 2 was quite surprising. This effect was further explored by testing the combination sacrificial system in core floods. The increase in enhanced oil recovery efficiency with and without the combination sacrificial system is given in Table 3 below. The combination system yielded a 50% increase in enhanced oil recovery efficiency over the use of the carboxylated lignosulfonate alone.

TABLE 3

| Ex. | Sacrificial Agent | Enhanced Oil Recovery Efficiency | Increase in Enhanced Oil Recovery Efficiency |
|---|---|---|---|
| 12 | None | 57.9% | — |
| 13 | 0.5% Marasperse 42Z | 64.5% | 6.6% |
| 14 | None | 44% | — |
| 15 | 0.5% Marasperse 42Z & 0.05% Natrosol 250 LR | 53.5% | 9.5% |

The procedure of Table 1 was followed to discover the reduction in surfactant adsorption given by three alkoxylated starches. The results of Table 4 indicate that the alkoxylated starch derivatives were much more effective in reducing surfactant adsorption than the hydroxyethyl cellulose was.

TABLE 4

| Ex. | Sacrificial Agent | Surfactant Adsorption Value, mg/g | Reduction In Surfactant Adsorption |
|---|---|---|---|
| 16 | None | 3.38 | — |
| 17 | 0.4% Staley 26JJ-1 | 0.68 | 80% |
| 18 | 0.4% Staley 68HH-168 | 0.80 | 76% |
| 19 | 0.4% Staley 92HH-87 | 0.45 | 87% |

The hydroxypropylated and carboxymethylated starch, Staley 92HH-87 gave the best results. It was tested in conjunction with the carboxylated lignosulfonate Marasperse 42Z in a core flood. The oil recovery results listed in Table 5 were in agreement with the results obtained on the surfactant adsorption reduction. Thus, it can be concluded that either the hydroxyethyl cellulose or the starch derivatives can be used in combination with the lignosulfonates to obtain combination sacrificial agent systems which are superior to any of the compounds alone in sandstone cores.

TABLE 5

| Ex. | Sacrificial Agent | Enhanced Oil Recovery Efficiency | Increase in Enhanced Oil Recovery Efficiency |
|---|---|---|---|
| 20 | None | 60% | — |
| 21 | 1.5% Marasperse 42Z | 67% | 7% |
| 22 | None | 60% | — |
| 23 | 1.5% Marasperse 42Z & 0.4% Staley 92HH-8 | 72% | 12% |

Several adsorption bottle tests were run to see if any improvement in surfactant adsorption would result from the use of an anionic cellulose derivative such as carboxymethyl cellulose instead of a nonionic cellulose derivative like ethoxylated cellulose. These adsorption tests were run with and without the Marasperse 42Z lignosulfonate. The same procedure as the previous bottle adsorption tests was followed. The results are given below in Table 6.

TABLE 6

| Ex. | Sacrificial Agent | Adsorption Value, mg/g | % Reduction in Adsorption |
|---|---|---|---|
| 24 | None | 7.8 | — |
| 25 | 0.1% Natrosol 250 LR | 3.4 | 56 |
| 26 | 0.5% Marasperse 42Z + 0.1% Natrosol 250 LR | 2.4 | 70 |
| 27 | 0.1% CMC 7L | 4.7 | 40 |
| 28 | 0.5% Marasperse 42Z + 0.1% CMC 7L | 4.5 | 42 |

The compound CMC 7L is a trademarked carboxymethyl cellulose compound sold by Hercules Inc. The results indicate that caroboxymethyl cellulose is much less effective in reducing surfactant adsorption than ethoxylated cellulose either alone or in combination with the lignosulfonate compound. Indeed, the lignosulfonate/carboxymethyl cellulose combination is no more effective than the carboxymethyl cellulose alone. Thus, it can be concluded that the combination of these two anionic polyelectrolytes to form a sacrificial agent system does not improve the effectiveness of the sacrificial agent system in a sandstone matrix. On the other hand, the combination of an anionic and a nonionic compound to form a sacrificial agent system may be substantially more effective than either compound employed alone.

The chemical structure of the nonionic alkoxylated cellulose compounds was investigated to determine the effect of varying the functional groups on the backbone of the compound. Propoxylated cellulose was tested alone and in combination with lignosulfonates, and the results were also compared with ethoxylated cellulose systems. To eliminate the molecular weight effect on adsorption, similar molecular weight compounds were used. To avoid surfactant/polymer interaction problems, the cellulose compounds were evaluated as pretreating agents in shake bottle tests. The reduction in surfactant adsorption afforded by the sacrificial systems is noted in Table 7 below. Klucel G is a trademarked propoxylated cellulose sold by Hercules Inc. having a molecular weight of approximately 300,000.

TABLE 7

| Ex. | Sacrificial Agent | Adsorption Value, mg/g | % Reduction in Adsorption |
|---|---|---|---|
| 29 | None | 14.6 | — |
| 30 | 0.1% Klucel G | 14.0 | 4 |
| 31 | 0.2% Klucel G | 14.0 | 4 |
| 32 | 0.5 Marasperse 42Z + 0.1% Klucel G | 11.5 | 21 |
| 33 | 0.5 Marasperse 42Z + 0.2% Klucel G | 11.2 | 23 |
| 34 | 0.1 Natrosol 250 MR | 12.2 | 16 |
| 35 | 0.2 Natrosol 250 MR | 11.0 | 25 |
| 36 | 0.5% Marasperse 42Z + 0.1% Natrosol 250 MR | 10.6 | 27 |
| 37 | 0.5% Marasperse 42Z + 0.2% Natrosol 250 MR | 9.8 | 33 |

The surfactant adsorption results indicate that the ethoxylated cellulose both alone and in combination with lignosulfonate is more effective as a sacrificial agent than the propoxylated cellulose on sandstone surfaces.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method of recovering hydrocarbons from a subterranean hydrocarbon formation which is penetrated by at least one injection well and at least one production well wherein chemicals are injected into the formation to sweep oil through the formation to at least one production well, which comprises:
    injecting into the formation a solution containing about 0.1% to about 10% by weight of a mixture of at least two sacrificial agents designed to prevent the loss to the formation of said injected chemicals, said mixture of at least two sacrificial agents comprised of one sacrificial agent which is a lignosulfonate and a second sacrificial agent selected from the group consisting of alkoxylated starch, esterified starch, oxidized starch, phosphated starch, alkoxylated cellulose, carboxyalkyl cellulose, carboxyalkylalkoxylated cellulose, alkylalkoxylated cellulose, cellulose sulfates, and cellulose acetate sulfates.

2. The method of claim 1, wherein the cellulose compounds have an average degree of substitution greater than or equal to about one.

3. The method of claim 1, wherein the cellulose compounds have an average molecular weight between about 40,000 and about 1,000,000.

4. The method of claim 1, wherein the starch compounds have an average molecular weight between about 20,000 and about 500,000.

5. The method of claim 1, wherein said injected chemicals are selected from the group consisting of surfactants, solubilizers, sulfonates, and polymers.

6. The method of claim 1, wherein the mixture of sacrificial agents is injected into the formation in solution with said injected chemicals.

7. The method of claim 1, wherein the mixture of sacrificial agents is injected into the formation prior to the injection of said injected chemicals.

8. The method of claim 1, wherein the mixture of sacrificial agents is injected into the formation after the injection of said injected chemicals.

9. The method of claim 1, wherein the mixture of sacrificial agents is injected into the formation in solution with said injected chemicals and after the injection of said injected chemicals.

10. The method of claim 1, wherein about 0.005 to about 0.4 pore volumes of solution containing a sacrificial agent is injected into the formation.

11. A method of recovering hydrocarbons from a subterranean hydrocarbon formation which is penetrated by at least one injection well and at least one production well, wherein chemicals are injected into the formation to sweep oil through the formation to at least one production well, which comprises:
injecting into the formation a solution comprising a mixture of sacrificial agents designed to prevent the loss to the formation of injected chemicals,
said mixture of sacrificial agents comprising about 0.1% to about 6% by weight of a carboxylated lignosulfonate, and about 0.02% to about 4.0% by weight of a hydroxyethyl cellulose having a degree of substitution of about 0.5 to about 2.0.

12. The method of claim 11, wherein about 0.2% to about 4.0% by weight of carboxylated lignosulfonate and about 0.03% to about 1.0% by weight of hydroxyethyl cellulose is injected into the formation.

13. The method of claim 11, wherein the carboxylated lignosulfonate and hydroxyethyl cellulose are injected into the formation in solution with said injected chemicals.

14. A method of recovering hydrocarbons from a subterranean hydrocarbon formation which is penetrated by at least one injection well and at least one production well, wherein chemicals are injected into the formation to sweep oil through the formation to at least one production well, which comprises:
injecting into the formation a solution comprising a mixture of sacrificial agents designed to prevent the loss to the formation of injected chemicals,
said mixture of sacrificial agents comprising about 0.1% to about 6.0% by weight of a carboxylated lignosulfonate, and about 0.1% to about 4.0% by weight of an alkoxylated starch having a degree of substitution of about 0.05 to about 0.5.

15. The method of claim 14, wherein about 0.2% to about 4.0% by weight of carboxylated lignosulfonate and about 0.2% to about 2.0% by weight of a propoxylated starch is injected into the formation.

16. The method of claim 14, wherein the carboxylated lignosulfonate and alkoxylated starch are injected into the formation in solution with said injected chemicals.

* * * * *